Dec. 7, 1948.   H. W. KLEIST   2,455,867
PRESSURE TYPE FREEZER
Filed Jan. 6, 1944   2 Sheets-Sheet 1

Inventor
Herman W. Kleist
by Parker &Carter
Attorneys.

Dec. 7, 1948. H. W. KLEIST 2,455,867
PRESSURE TYPE FREEZER
Filed Jan. 6, 1944 2 Sheets-Sheet 2
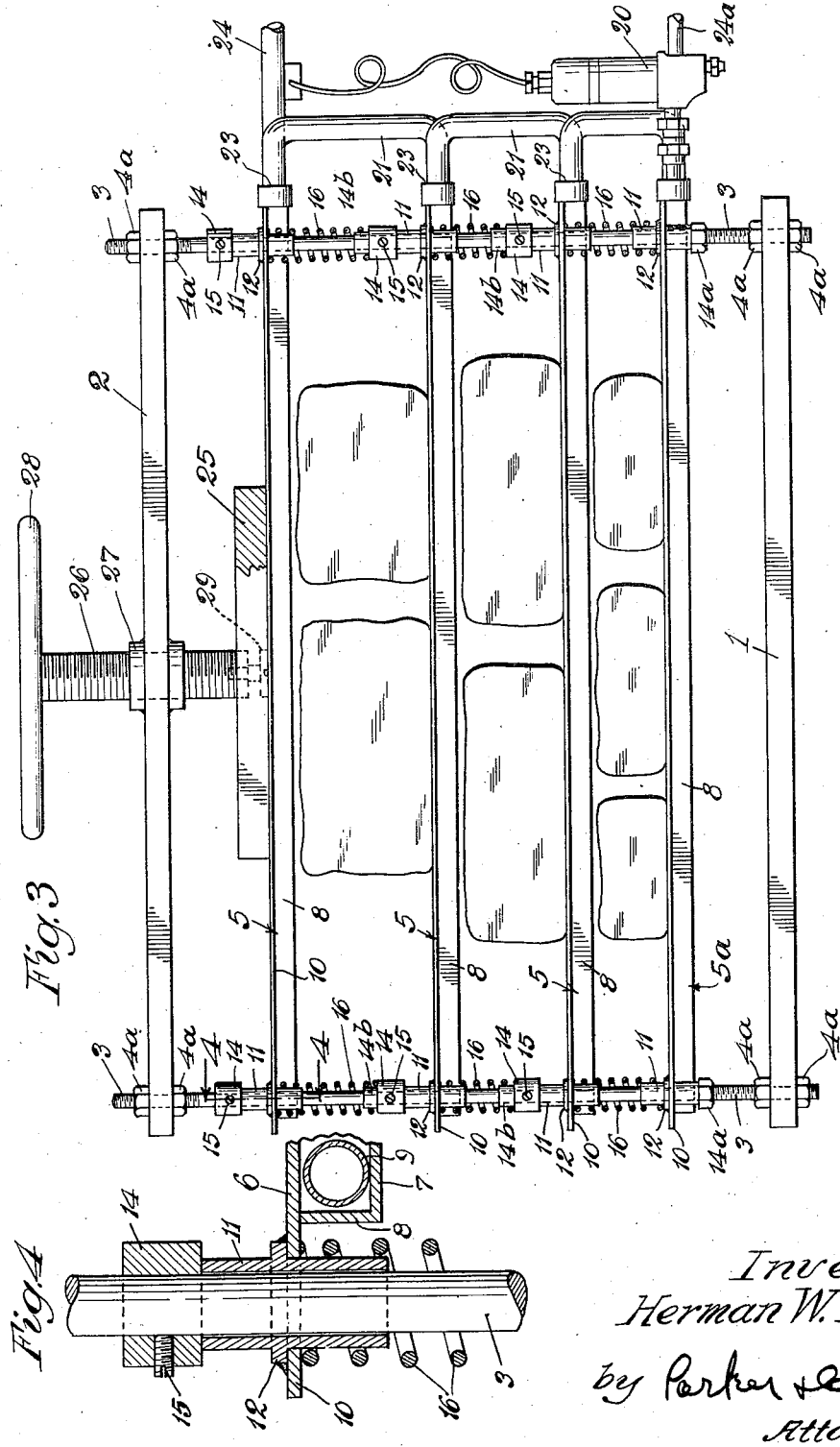
Inventor
Herman W. Kleist
by Parker & Carter
Attorneys.

Patented Dec. 7, 1948

2,455,867

UNITED STATES PATENT OFFICE 2,455,867

PRESSURE TYPE FREEZER

Herman W. Kleist, Chicago, Ill., assignor to Dole Refrigerating Company, Chicago, Ill., a corporation of Illinois Application January 6, 1944, Serial No. 517,171

6 Claims. (Cl. 62—114)

My invention relates to an improvement in freezing devices and has one purpose to provide an improved means for freezing packaged materials such as foodstuffs.

Another purpose is to provide an improved device for freezing packages of material, or units of material, such as foodstuffs under pressure.

Another purpose is to provide an improved freezing mechanism for simultaneously freezing a substantial number of packages or units of material at the same time.

Another purpose is to provide a structure of the class described with improved means for readily freeing the material treated after it is frozen.

Another purpose is to provide means for maintaining pressure upon material undergoing freezing.

Another purpose is to provide a freezing structure which may be adjusted to freeze units of material of varying sizes and which may be employed simultaneously to freeze units of different size.

Other purposes will appear from time to time throughout the specification and claims.

My invention is illustrated more or less diagrammatically in the accompanying drawings, wherein:

Figure 3 is a side elevation; and

Figure 4 is a detail section, on an enlarged scale on the line 4—4 of Figure 3.

Like parts are indicated by like characters throughout the specification and drawings.

Figure 2:
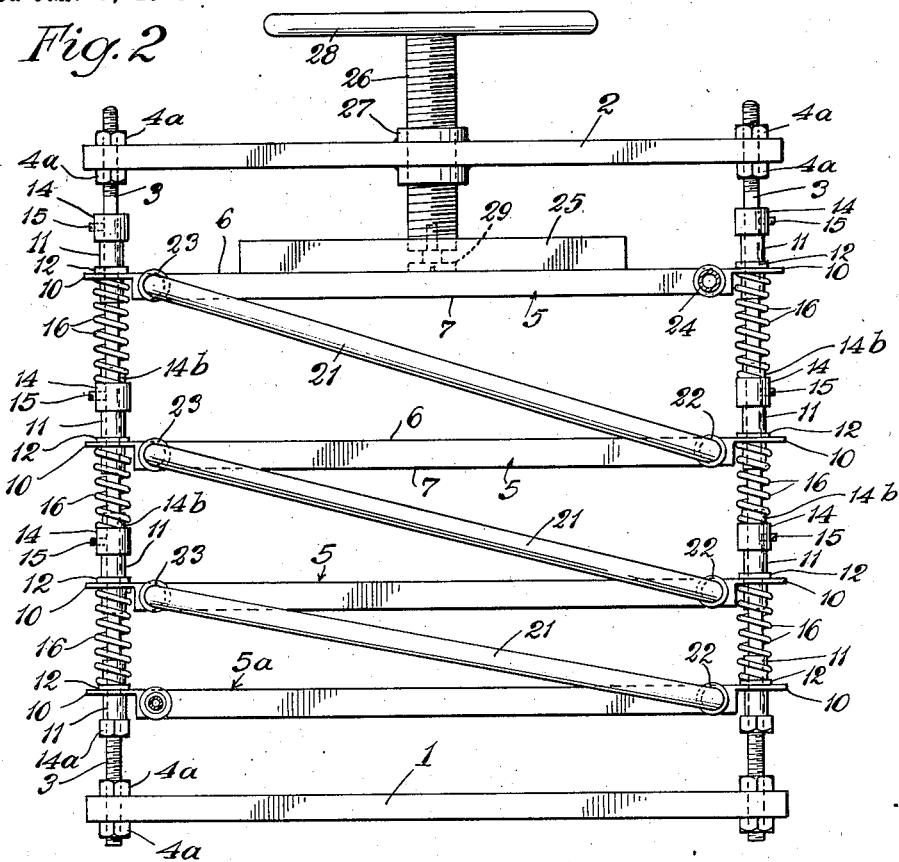
Figure 2 is an end elevation on an enlarged scale.
Figure 1:
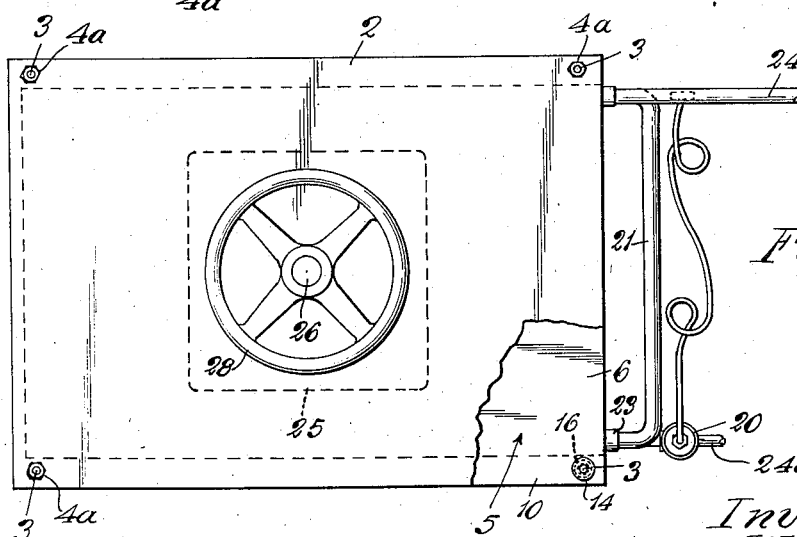
Figure 1 is a top plan view.

Referring to the drawings, I employ a frame which is shown as including a bottom plate or frame member 1, and a top plate or frame member 2 connected by a plurality of vertical frame members 3, herein shown as rods of cylindrical exterior surface. It will be understood that the vertical members may be provided of varying form and of varying number. I find it convenient, however, to employ rods, such as are shown, at the corners of the frame members 1 and 2. The frame members 1 and 2 may be secured to the rods, for example, by nuts 4a. The nuts may also be employed as means for adjusting the members 1 and 2 to a desired spaced relationship.

Slidable on the rods 3 are a plurality of freezing units 5. The details of the units do not of themselves form parts of the present invention. I may employ, however, vacuum plates, each of which has an upper wall 6, a lower wall 7, side walls 8, and any suitable interior coil structure 9, formed of tubing in closed contact with the walls 6 and 7. The interior of the individual units may be maintained under vacuum, by means not herein shown, and may include a eutectic fluid. In the structure as shown in detail in Figure 4, I illustrate an outer extension of the wall 6 as at 10. This extended portion is apertured to receive a sleeve 11 with an intermediate flange 12. It is preferably soldered or otherwise permanently secured in position as shown. Spaced along the rods 3 are a plurality of abutment members 14. If desired, they may be adjustable and may be held in desired position, for example by set screws 15. In the device as herein shown, there is a set of abutments 14, for each individual freezing or vacuum plate 5, a set of abutments being shown as located below each said plate except the bottom plate 5a. The bottom plate 5a may rest on an adjustable set of abutments, for example the nuts 14a screw threaded upon lower threaded portions of the rods 4.

Under compression between each abutment 14 and the vacuum plate 5, located thereabove, is a coil spring 16. These sets of coil springs tend to urge the plates upwardly away from the abutments 14. Each abutment 14 may have a central spring penetration portion 14b. Thus each spring 16 surrounds and is centered by a portion 14b of an abutment 14 at its lower end and the lower portion of one of the sleeves 11 at its upper end. It will be understood that the plates 5 and 5a are in circuit with any suitable refrigerant such as a volatile refrigerant which may be delivered to the coil or coils 9, which constitute the evaporator coils of the system. Since the details of the refrigerant system do not of themselves form part of the present invention, they are not herein illustrated. However, 20 is any suitable expansion valve or similar element which supplies a volatile refrigerant to the plates 5 and 5a, the coils 9 of which, arranged in series, constitute evaporator units. In order to maintain the necessary flow of regrigerant at all normal positions of the plates 5 and 5a, I provide a flexible connection between plates. I illustrate connecting tubes or passage members 21 extending from plate to plate. These may themselves be formed of flexible tubing or any suitable flexible connecting means may be employed between the ends of the member 21 and the plates. It is essential that the flow of the refrigerant shall not be interrupted by or affected by relative movement of the vacuum plates 5 or 5a. 24 is the discharge pipe from the coil 9 of the topmost vacuum plate 5. Any suitable inlet connection 24a may be employed for delivering a volatile refrigerant to the bottom plate 5a. Thus, I provide flexible connecting means between the vacuum plates which permits the entire stack of plates to be moved from open position to compressed position and from compressed position to open position without disturbing the flow of refrigerant through the plates.

It will be understood that in the use of my device, the packages or units of material to be frozen are inserted in the space between the plates. Each unit or package is subjected to the upper cold surface of one plate and the lower cold surface of the plate next above it. After the material is inserted, the plates are moved together to subject the material between the plates to pressure, and to maintain a close contact between each unit of material being treated and the surfaces of the plates immediately above and below it.

In order to control the movement of the plates, I illustrate a pressure plate 25 above the topmost vacuum plate 5. The pressure plate 25 may be moved downwardly against the stack of plates by any suitable means. I illustrate for example a clamp screw 26, screw threaded in a nut 27 on the upper frame member 2. 28 is any suitable actuating member, hand wheel or the like. The screw 26 may be rotatably connected at the bottom to the abutment plate 25, for example, by a screw 29. Thus when the hand wheel 28 is actuated, it thrusts the abutment plate 25 downwardly against the upper surface of the topmost vacuum plate 6. As the material to be treated is interposed between the individual plates, a continued downward movement of the screw 26 results in the compression of the entire stack of plates. This in turn subjects the material inserted between the plates to pressure, and maintains an intimate contact between the materials being treated and the plates.

It will be realized that when the clamp screw 26 is withdrawn to its uppermost position, the various springs 16 are effective to separate the vacuum plates. The plate 5a will set in its bottom position but the remaining plates will be raised by the springs 16. The parts may be proportioned so that the springs 16 are effective to raise each of the plates 5 as high as the set of abutments 14, next above will permit.

It will be realized that I thus provide a light and convenient unit for freezing foodstuffs and other substances, for example when packaged, while subjecting the goods treated to pressure which maintains an intimate contact between the goods and the opposed freezing surfaces, and which also may be employed to form or proportion the units or packages being frozen. The entire device may be enclosed in any suitable housing or cabinet not herein shown.

It will be realized that whereas I have described and illustrated an operative device, still many changes might be made in the size, shape, number and disposition of parts without departing materially from the spirit of my invention and I wish, therefore, that my showing be taken as in a large sense as illustrative rather than as limiting me to the precise details.

The use and operation of my invention are as follows:

I provide a stack or group of freezing members such as vacuum plates. The individual plates are movable in relation to each other. In the use of the device, the plates are released to separate as far as the stops 15 will permit. The springs 16 are effective to expand or separate the plates. The material to be treated may then be placed in the spaces between the plates.

Thereafter, the operator subjects the entire stack to compression by rotating the clamping screw 26. This results in the downward movement of the plates 6 against expansion of the springs 16, until the materials located between the plates are subjected to pressure. Thus each package or body of material contacts the upper relatively plane refrigerating surface of one of the plates and the lower relatively plane refrigerating surface of the plate next above. It is preferable though not essential that the plates have substantially plane surfaces and that the opposed surfaces of each pair of plates be substantially parallel with each other.

By varying the location of the stops 14 on the frame members or guides 3, it is possible to vary the space between adjacent plates. Thus packages or units of different sizes may be simultaneously frozen.

It will be realized that any suitable conventional refrigerating circuit may be employed in which the usual combination of compressor, condenser and evaporator is employed. The coils within the plates 5a and 6 constitute evaporator coils in such a system.

I claim:

1. In a device for freezing materials, a base, guiding means upstanding from said base, a plurality of generally horizontal freezing plates movable on said guiding means, means for cooling said freezing plates, means for compressing said freezing plates, and the material between said plates together, and yielding means adapted, when the plates are released, to separate said plates and to permit the ready removal of the materials therebetween, and means for limiting the movement of said plates caused by said yielding means.

2. In a device for freezing materials, a plurality of relatively movable, generally parallel, freezing plates, a refrigerant circuit in which said plates are included, said plates constituting evaporators in said circuit, means for clamping said plates and the material to be frozen together, and for thereby subjecting the material to be frozen to pressure, means for separating said plates when the clamping means are released, said refrigerant circuit including flexible refrigerant conducting connections between plates, adapted to permit relative movement of the plates without interruption of the flow of the refrigerant, the flexible refrigerant conducting connections being so disposed that refrigerant circulates through the system and through the plates in series.

3. In a device for freezing materials, a plurality of relatively movable, generally parallel, freezing plates, a refrigerant circuit in which said plates are included, said plates constituting evaporators in said circuit, means for clamping said plates and the material to be frozen together, and for thereby subjecting the material to be frozen to pressure, means for separating said plates when the clamping means are released, said refrigerant circuit including flexible refrigerant conducting connections between plates, adapted to permit relative movement of the plates without interruption of the flow of the refrigerant, and adjustable limit means for said plates, effective to vary the possible movement of the individual plates between open and closed position.

4. In a device for freezing materials, a base, guiding means upstanding from said base, a plurality of generally horizontal freezing plates movable on said guiding means, means for cooling said freezing plates, means for compressing said freezing plates, and the material between said plates together, and yielding means adapted, when the plates are released, to separate said plates and to permit the ready removal of the materials therebetween, and means for limiting the movement of said plates caused by said yielding means, the limiting means comprising abutments movable on the guiding means, means for locking abutments in adjusted position, the abutments serving also as supports for the yielding means whereby the abutments serve also to adjust the tension of the yielding means.

5. In a device for freezing materials, a plurality of relatively movable, generally parallel, freezing plates, a refrigerant circuit in which said plates are included, said plates constituting evaporators in said circuit, means for clamping said plates and the material to be frozen together, and for thereby subjecting the material to be frozen to pressure, means for separating said plates when the clamping means are released, and flexible refrigerant conducting connections between plates, adapted to permit relative movement of the plates without interruption of the flow of the refrigerant, and means for adjusting the relative spacing of said plates at the open position, the adjusting means comprising abutments movable on the guiding means, means for locking the abutments in adjusted position, and yielding means adapted to urge the plates in predetermined directions, the abutments serving also as supports for the yielding means whereby the abutments serve also to adjust the thrust of the yielding means.

6. In a freezer, a plurality of horizontal freezing plates, uprights adapted to guide them in vertical movement, yielding means interposed between the plates tending to move them upwardly and separate them, stop members on the guiding means adjustable in position whereby the tension of the yielding means may be adjusted, the stop members being adapted also to serve to limit the upward excursion of each individual plate, adjustable means for overcoming the thrust of the yieldng means to compress material to be frozen between the plates, flexible fluid tight connections between said plates in series, said plates being connected, by said connections, and being adapted to receive a coolant passing through the plates in series, at all permitted and relative positions of the plates.

HERMAN W. KLEIST.

REFERENCES CITED

The following references are of record in the file of this patent:

UNITED STATES PATENTS

| Number | Name | Date |
| --- | --- | --- |
| 2,280,133 | Sundbach | Apr. 21, 1942 |
| 2,283,923 | Hall | May 26, 1942 |
| 2,329,746 | Davison | Sept. 21, 1943 |